United States Patent [19]

Glass et al.

[11] Patent Number: 5,039,319

[45] Date of Patent: Aug. 13, 1991

[54] PROCESSES AND APPARATUSES FOR REMOVING ORGANOCHEMICAL COMPONENTS

[75] Inventors: Reinhard Glass; Uwe Penzel, both of Voerde, Fed. Rep. of Germany

[73] Assignee: Arasin GmbH, Voerde-Emmelsum, Fed. Rep. of Germany

[21] Appl. No.: 469,347

[22] Filed: Jan. 24, 1990

Related U.S. Application Data

[62] Division of Ser. No. 209,930, Jun. 22, 1988, Pat. No. 4,925,462.

[51] Int. Cl.$^5$ ................... B01D 47/04; B01D 53/18
[52] U.S. Cl. .............................. 55/178; 55/185; 55/223; 55/228; 55/257.6
[58] Field of Search ............... 55/37, 87, 178, 183, 55/185, 223, 228, 251.6

[56] References Cited

U.S. PATENT DOCUMENTS

| | | | |
|---|---|---|---|
| 1,736,070 | 11/1929 | Campbell | 55/87 |
| 1,894,508 | 1/1933 | Barthelemy | 55/87 X |
| 2,070,578 | 2/1937 | Bowman | 55/223 X |
| 3,335,549 | 8/1967 | Hendrix | 55/178 |
| 3,626,672 | 12/1971 | Burbidge | 55/185 |
| 3,747,304 | 7/1973 | Elmer et al. | 55/178 |
| 3,835,624 | 9/1974 | Ahlborg | 55/87 X |
| 3,907,526 | 9/1975 | Saleem et al. | 55/223 |
| 3,997,303 | 12/1976 | Newton | 55/185 X |
| 4,003,724 | 1/1977 | Payne et al. | 55/228 X |
| 4,287,161 | 9/1981 | Agrawal | 55/178 X |
| 4,528,001 | 7/1985 | Yokogawa et al. | 55/37 |
| 4,762,593 | 8/1988 | Youngner | 55/178 X |
| 4,818,346 | 4/1989 | Bentham et al. | 55/185 X |
| 4,849,027 | 7/1989 | Simmons | 55/178 X |

FOREIGN PATENT DOCUMENTS 1277413 6/1972 United Kingdom .................. 55/37

*Primary Examiner*—Robert Spitzer
*Attorney, Agent, or Firm*—Foley & Lardner

[57] ABSTRACT

The present invention relates to a process, an apparatus and a chemical agent for removing an organochemical component from a gas flowing through the froth scrubber tower at least a cross-sectional area of which is covered by a surfactant-containing froth. The surfactant-containing froth comprises at least one surfactant and a liquid and/or an organochemical solid that is soluble or dispersible in the surfactant, and a gas. The lower froth bubbles in the froth scrubber tower are destroyed by the inherent pressure of the continuously introduced froth and of the solvent taken up by the froth and by washing water and/or fresh solutions and the like introduced thereto. The liquified froth thus formed is withdrawn together with the organochemical components and subsequently separated from the surfactant-containing liquid.

12 Claims, 3 Drawing Sheets

PROCESSES AND APPARATUSES FOR REMOVING ORGANOCHEMICAL COMPONENTS

This application is a division of application Ser. No. 07/209,930, filed June 22, 1988, now U.S. Pat. No. 4,925,462.

BACKGROUND OF THE INVENTION

The present invention relates to processes and apparatuses and an agent for removing organochemical components from a gas flowing through a channel or vessel whose cross-section or area of passage is covered by froth, the gas containing organochemical components and, before passing through the froth, passes through at least one perforated element, grid element and/or screen element onto which the froth is introduced from a froth production unit or froth dispensing unit which is connected to the channel or vessel, and/or is formed directly in the channel or vessel, a special-purpose froth-forming liquid being used and a particular procedure being carried out for removal of the organochemical component. Within the present invention the term "an organochemical component" includes a solid particle and a liquid particle in the form of a vapor suspended in a gas and the term "gas" includes a gas saturated or unsaturated with a vapor.

Apparatuses for removing suspended particles from a gas are known; processes using these apparatuses and incorporation of froth are also known. In German Patent 1,807,327, an apparatus is employed for removing suspended particles from a gas flowing upward through a vertical channel whose cross-section is covered by a filter medium in the form of froth introduced onto a sieve tray arranged in the filter space of the channel, an arrangement being provided for discharging the filter medium containing the suspended particles. In the apparatus disclosed therein, a foam generator is connected, in a known manner irrespective of the gas to be cleaned, to the filter space in a manner such that the froth is introduced onto the sieve tray in the filter space. With the aid of these apparatuses, however, it is only possible to remove suspended particles from a gas but not solvents, vapors or other organochemical contaminants in the gas or in the liquid phase which are present in the gas.

SUMMARY OF THE INVENTION

It is an object of the present invention to provide a process, an agent and apparatus that are improved compared with the prior art.

It is a particular object of the present invention to remove organochemical solvents from gases and to recover the organochemical solvent and/or the froth-forming liquid.

It is another object of the present invention to operate or employ the process, apparatus and agent used for this purpose continuously or semicontinuously and to employ environmentally acceptable agents inasmuch as they can be employed repeatedly in cycles.

In accomplishing these and other objects, there has been provided a process for removing an organochemical component from a gas comprising the steps of allowing a gas that comprises an organochemical component to flow through at least one perforated grid element in a froth scrubber tower into an area where froth can be introduced; introducing froth that comprises bubbles onto said grid element; allowing the gas to interact with the froth bubbles; allowing the froth bubbles to settle to a liquid form; removing the liquid; and removing the organochemical component from the liquid; wherein said froth comprises a surfactant-containing liquid, a froth-generating gas or air and/or a solid organochemical substance that is soluble or dispersible in the surfactant-containing liquid; and wherein said organochemical component is soluble in said surfactant-containing liquid.

In accordance with another aspect of the invention, there has been provided a method of using a surfactant-containing liquid for removal of an organochemical component from a gas that comprises an organochemical component comprising the steps of inducing said surfactant-containing liquid to form a froth, mixing said froth with said gas, then allowing the froth to settle to a liquid and removing the liquid, wherein said surfactant-containing liquid is capable of forming a froth.

In accordance with a further aspect of the present invention, there has been provided a chemical agent for removing an organochemical component from a gas comprising an organochemical liquid mixture that is capable of forming a froth, wherein the mixture comprises a surfactant-containing liquid and an organochemical liquid that has a boiling point above 470° K.

In accordance with yet another aspect of the invention, there is provided an apparatus for removing an organochemical component from a gas, comprising a froth scrubber tower that comprises an inlet for entry of a gas to be decontaminated, an outlet for exit of decontaminated gas, at least one perforated grid element attached to and located inside the froth scrubber tower such that a cross-sectional area of the froth scrubber tower is covered by at least one perforated grid element, and a chamber for interaction between the gas and the froth. A froth production unit is connected to the froth scrubber tower, and the connection is located above at least one perforated grid element. At least one distillation device or evaporation device is connected to the froth scrubber tower, and a droplet removal device is located inside and in close proximity to the top of the froth scrubber tower before the outlet for exit of the decontaminated gas.

DETAILED DESCRIPTION OF THE PREFERRED EMBODIMENTS

Figure 1:
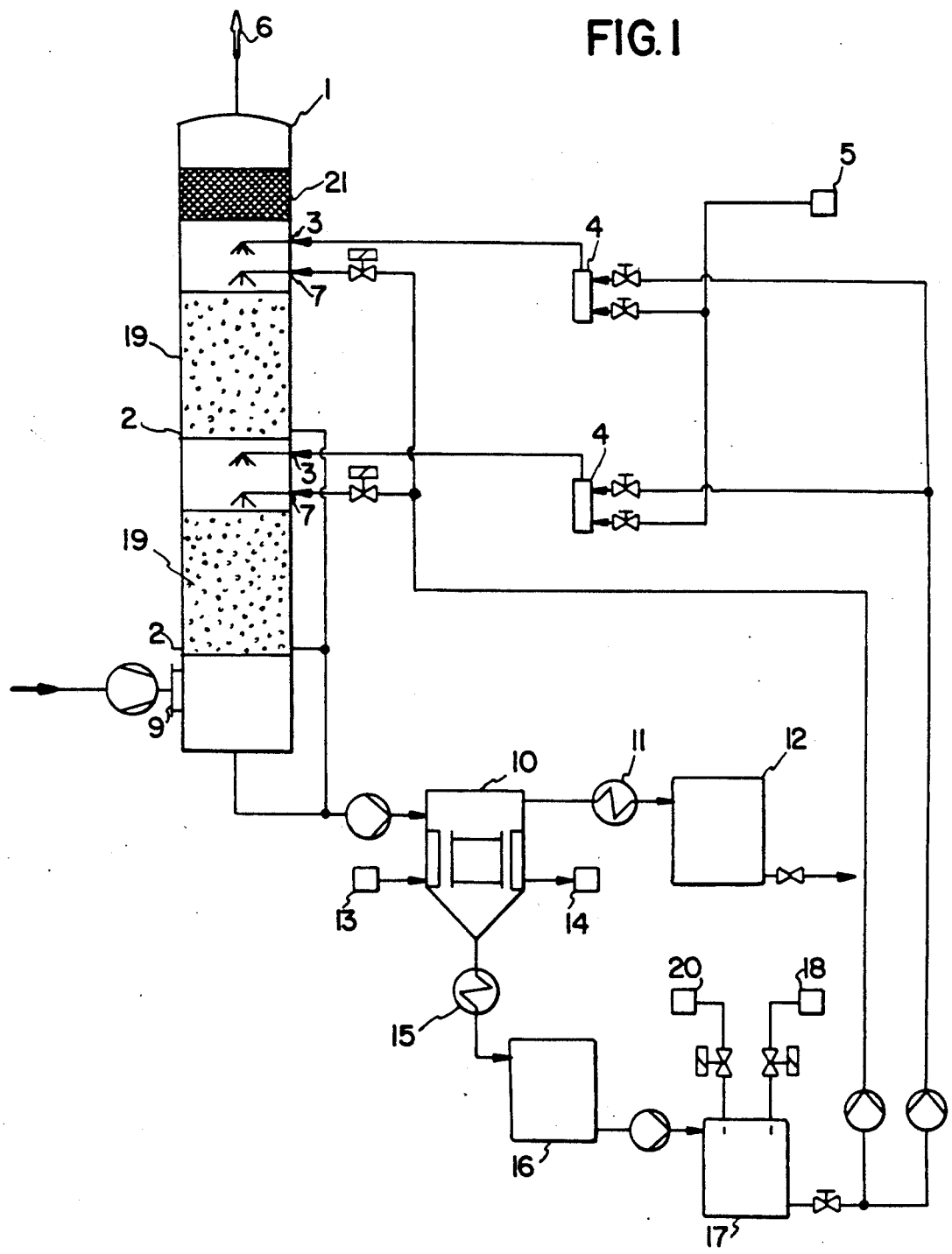
FIGS. 1, 2 and 3 represent schematic illustrative embodiments of the process and the apparatuses according to the present invention.

FIG. 1 shows the channel or vessel i.e., the froth scrubber tower. The gas enters the vessel through an inlet, a connector or connecting aperture 9, and flows through one or more perforated elements, grid elements and/or screen elements 2 above which the froth 19 is disposed. One or more pipes for introducing froth or surfactant-containing liquids or froth dispensing devices and/or froth distribution devices 3 are connected to the froth scrubber tower 1. In one embodiment, the froth production takes place directly in the froth scrubber tower 1. The froth scrubber tower 1 is connected to the distillation device 10 for fractional distillation or to an evaporation device, preferably a thin-layer evaporator or falling film evaporator. Reference numeral 13 represents the supply of a heating medium, and 14 represents the discharge of the heating medium. A cooling device 11 and a tank 12 for the distilled-off or evaporated organochemical solvent, i.e., solvent tank, are attached to the distillation and/or evaporation device 10 via at least one hose and/or pipe. The distillation and/or evaporation device is connected to a further tank, a surfactant tank 16 for the surfactant-containing liquid, co-using a pipe and/or hose and a cooling device, i.e., a surfactant cooler.

The tank for the surfactant-containing liquid 16 is coupled with a batch tank 17 for adjusting the desired use concentration, and the latter is coupled to a froth production unit 4 and/or a froth generator and to the tower and/or froth scrubber vessel 1. Reference numeral 5 represents a gas pressure unit, e.g., a compressed air unit. The batch tank is preferably combined with tanks for the starting materials 18 and/or 20 for one or more components of the surfactant-containing liquid.

Figure 2:
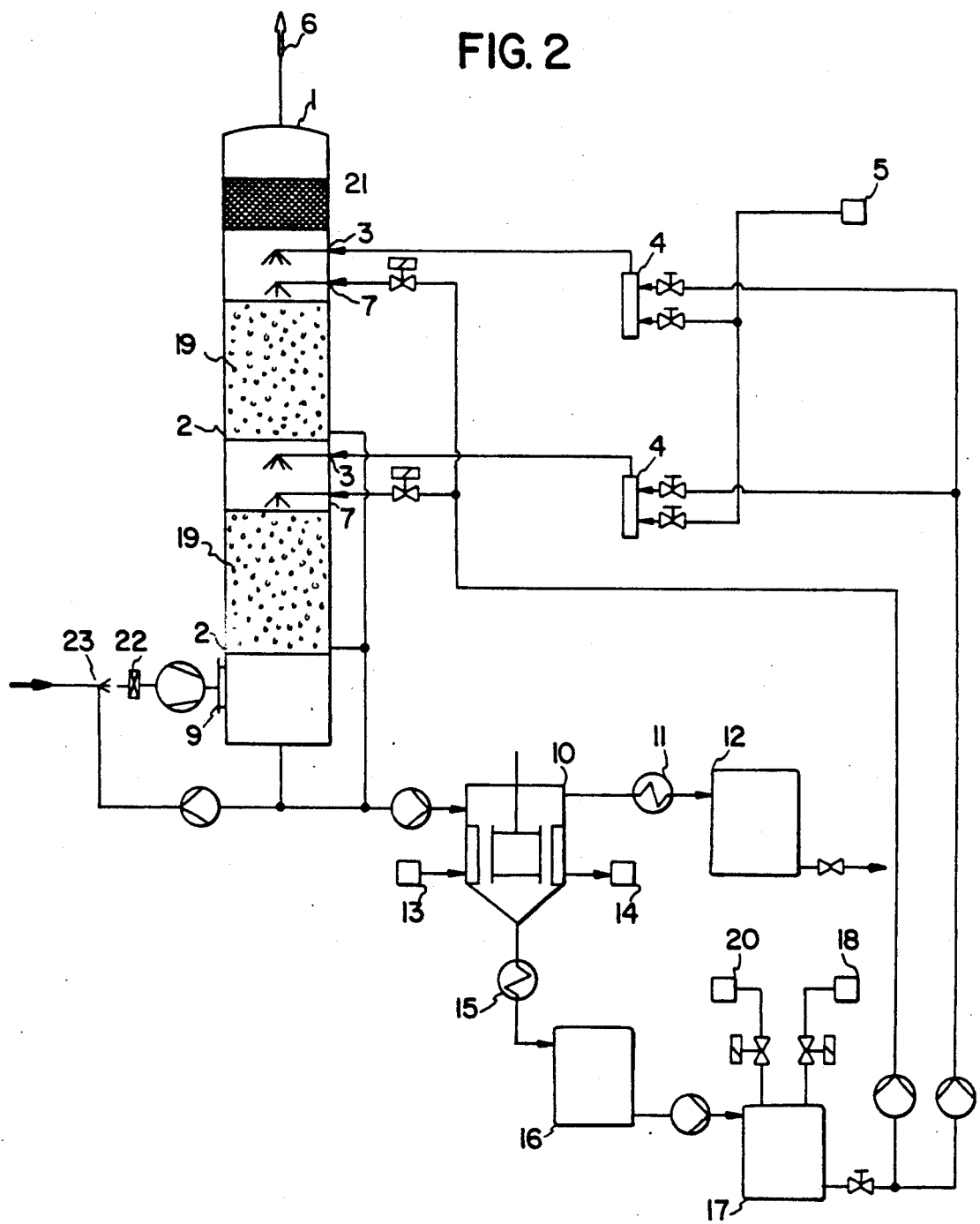

FIG. 2 shows at least one distribution device 7 for introducing surfactant-containing liquid in the form of fresh solutions, solutions from the batch tank and/or for resaturating the individual components present in the surfactant-containing liquid. The distribution device 7 is arranged above the sieve tray at a certain distance.

According to an advantageous embodiment, surfactant-containing liquid (fresh solution) and/or components of the surfactant-containing liquid used (for concentration or froth control) are introduced at numeral 7 from a tank 8 (shown in FIG. 3) in order to regulate the froth depth, the froth bubble size and froth composition. The gas entering the lower part at inlet 9 of the froth scrubber tower 1 emerges in the region of the upper part of the froth scrubber tower 1 at outlet 6, after the gas has passed through the droplet removal device 21.

In FIG. 2 reference numeral 23 represents the means for pre-injection of the surfactant-containing liquid into the gas before the inlet 9. The numeral 22 corresponds to a swirl regulator for regulating the amount of gas entering in and for distributing the liquid injected by said means 23.

The invention provides a process and apparatuses for removing organochemical components from a gas flowing through a channel or vessel 1 (froth scrubber tower) whose cross-section or area of passage is covered by froth 19, the gas containing organochemical components being passed, before passing through the froth, through at least one perforated element, grid element and/or screen element 2 onto which the froth is introduced from a froth production unit and/or froth dispensing unit which is connected to the channel or vessel (froth scrubber tower), or is formed directly in the froth scrubber tower 1.

In one preferred embodiment of the present invention, the gas containing organochemical solvents and/or organochemical contaminants is passed through a surfactant-containing froth, comprising surfactant and an organochemical liquid and/or an organochemical solid which is soluble or dispersible in the surfactant, preferably anhydrous or low-water surfactant solutions or anhydrous or low-water surfactant dispersions, and an introduced gas or air. During this procedure, the organochemical solvent is taken up by the froth, and the froth bubbles, preferably the froth bubbles located in the lower layers (the first layers relative to the direction of passage of the solvent-containing gas), are destroyed under the inherent pressure of the continuously introduced froth and of the solvent taken up by the froth and under the action of gravity and/or by introducing washing water and/or fresh solutions and/or chemical components of the surfactant-containing liquid used for concentration, and removed, preferably withdrawn at the base, and subsequently separated from the surfactant-containing liquid, preferably the surfactant-containing solution or surfactant-containing dispersion. The gas or the air is preferably introduced by use of a slight excess pressure or reduced pressure. The excess pressure is expediently up to about 3,000 Pa, preferably up to about 1,000 Pa. The reduced pressure is expediently up to about 5,000 Pa, preferably up to about 1,000 Pa.

According to a preferred embodiment of the present invention, the solvent- and surfactant-containing liquid withdrawn from the froth scrubber tower is subjected to distillation, preferably fractional distillation, or evaporation, preferably in a thin-layer evaporator or falling film evaporator, and separated from at least one, preferably from all, of the organochemical solvents contained therein. According to a preferred embodiment of the invention, removal of any dust contained in the offgas is simultaneously carried out. The dust removal is preferably carried out using a dust scrubber in the froth scrubber tower 1.

According to the process according to the invention, the surfactant-containing liquid contains at least one water-soluble, water-insoluble and/or sparingly water-soluble compound, the organochemical solvent to be removed from the offgas being soluble in at least one of the compounds present in the surfactant-containing liquid, preferably in at least one water-insoluble or sparingly water soluble compound.

According to a further preferred embodiment of the process according to the invention, the surfactant-containing liquid contains, in addition to the surfactant or surfactant mixture, at least one organochemical liquid having a boiling point above about 470° K., preferably above about 520° K., and/or a chemical substance which is solid at room temperature and is soluble in the surfactant or surfactant mixture. The preferred organochemical liquids, or liquids containing finely dispersed or dissolved solid mixtures, employed in this case are those in which the solvents present in the gas are soluble. The surfactant-containing liquids are preferably anhydrous or low in water. Depending on the type of the gases to be absorbed, they contain, according to one embodiment, a maximum of about 10% by weight of water (relative to 100% by weight of surfactant-containing liquid).

According to a preferred embodiment, the surfactant-containing liquid comprises or contains a mixture of at least one surfactant and at least one liquid plasticizer and/or solid plasticizer that is soluble and/or dispersible in the surfactant.

The plasticizers employed are above all compounds that are soluble in the surfactant or surfactant mixture and/or in the liquid or gaseous organochemical components, preferably organochemical solvents, present in the gas. In addition, plasticizers that are liquid at room temperature and/or at the process temperature are preferably employed. Preferred plasticizers are, for example, alkyl, aryl or aralkyl phthalates, preferably, dibutyl, dioctyl and benzylbutyl phthalates; alkyl phosphates or phosphoric acid esters, preferably, tributyl phosphate; adipates, preferably, benzyl octyl adipate and/or diisononyl adipate and di(2-ethylhexyl) adipate; stearates; and oleates, for example, alkyl stearates or alkyl oleates, preferably, butyl oleate, butyl stearate or amyl stearate; bis(dimethylbenzyl) ether, ethyl p-toluenesulfonate, glycerol esters; glycerol ethers or higher molecular weight glycol ethers. As a replacement or partial replacement for plasticizers, the same amounts by weight of organochemical liquid compounds having more than 5 carbon atoms, i.e., $C_5$, and based on ketones, for example, ketones having alkyl, aryl or aralkyl groups, preferably, benzophenone or ethyl benzophenone, and/or polyvinyl alkyl ethers, preferably, polyvinyl methyl ethers, may advantageously be used. According to an embodiment, mixtures are preferably employed.

The surfactants employed are surfactants which are known per se. The weight ratio between the surfactant or surfactant mixture and the plasticizer or plasticizer mixture is between about 4:1 and about 1:250, preferably between about 1:5 and about 1:200.

The surfactants preferably employed are nonionic surfactants, preferably, alkyl and alkylphenyl polyethylene glycol ethers, fatty acid alkylolamides, saccharose fatty acid esters or trialkylamine oxides, and/or fluorine-containing surfactants.

According to a preferred embodiment, the nonionic surfactants employed are mixed with ionic surfactants, preferably, cationic and/or anionic and/or amphoteric surfactants.

According to a preferred embodiment, the weight ratio between the nonionic surfactant and the ionic surfactant is from about 50:1 to about 1:8, preferably from about 25:1 to 5:1.

The surfactants or surfactant mixtures employed are preferably polyoxyethylene sorbitan oleate laureate and/or polyalkylene glycol ethers and/or polyoxyethylene nonylphenol and/or polyoxyethylene 10 oleyl alcohol, alone or combined with isopropylamine dodecylbenzene-sulfonate and/or alkylaryl sulfonate or fluorine-containing surfactants.

According to a further embodiment, an organochemical liquid having a boiling point of greater than about 470° K., preferably greater than about 520° K., and/or a vapor pressure below about 5 Pa, preferably below about 1 Pa, is also used in addition to the surfactant/plasticizer mixture.

Depending on the type of surfactant or plasticizer employed and/or on the type of organochemical solvent to be removed, such organochemical liquids are aliphatic $C_4$–$C_{12}$, preferably $C_5$–$C_{10}$, alcohols, glycols, glycol esters and glycol ethers, glycerol, liquid glycerol ethers and/or liquid polyglycerols.

According to this embodiment, these previously mentioned organochemical liquids are employed in the surfactant/plasticizer mixture up to about 50% by weight, preferably up to about 30% by weight (relative to the total surfactant liquid) or used in place of the plasticizer. Depending on the type of organochemical solvent to be removed, from about 0.05% to about 10% by weight, preferably from about 0.1% to about 4% by weight, of water may also be used in the surfactant liquid.

In the process according to the invention, the surfactant-containing liquid which is not evaporated in the thin-layer evaporator or falling film evaporator is withdrawn, preferably at the base or in the vicinity of the base, cooled and directly thereafter, or after saturation or adjustment of the necessary concentration of the surfactant-containing liquid, returned to the channel or vessel (froth scrubber tower) and/or froth generator for froth formation. The solvent distilled off from the distillation device is cooled and transferred into a tank or collecting vessel. Depending on the type and chemical composition, the solvent can be employed directly (paint solvent and the like) or purified or transferred to disposal.

The invention furthermore relates to a chemical agent which forms a froth with gases or air, for removing organochemical components, preferably solvents, from a gas, comprising an organochemical liquid or a liquid mixture, the organochemical liquid or the liquid mixture comprising a surfactant-containing liquid, preferably a surfactant-containing solution or dispersion, and contains, in addition to at least one surfactant or surfactant mixture, a further organochemical liquid having a boiling point above about 470° K., preferably above about 520° K., and/or a vapor pressure below about 5 Pa, preferably below about 6 Pa, and the use of the surfactant-containing or surfactant mixture-containing liquid, preferably a surfactant-containing solution or dispersion, and of the froth produced therefrom by introduction of gas or air, for absorption and/or removal of organochemical solvent-containing gases. The ratio by weight between the surfactant or surfactant mixture and the other substance(s), preferably plasticizers, plasticizer mixtures or plasticizer-containing liquid or plasticizer-containing dispersion, contained in the surfactant-containing liquid is from about 4:1 to about 1:250, preferably from about 1:5 to about 1:200.

In this case, the above-mentioned surfactant/plasticizer mixture is preferably used.

The invention furthermore relates to an apparatus for removing organochemical components from a gas, comprising a channel or vessel (froth scrubber tower) 1, at least one perforated element, grid element and/or screen element 2, which is arranged in the froth scrubber tower 1, preferably arranged so that the cross-section or the area of passage of the tower or vessel is covered by at least one perforated element, grid element and/or screen element, a froth production unit 4 and/or froth dispensing unit and/or a froth dispensing device or froth distribution device 3 located above at least one perforated element, grid element and/or screen element being attached either directly or indirectly via at least one pipe or hose to the froth scrubber tower 1, the froth scrubber tower 1 being connected to at least one distillation device, preferably a distillation device 10 for fractional distillation, or to an evaporation device, preferably a thin-layer evaporator, vacuum evaporator or falling film evaporator, in which at least one organochemical solvent is removed from the gas. A droplet removal device is preferably arranged at or before the outlet for the cleaned gas.

According to a preferred embodiment, at least one cooling device 11 and at least one tank 12 for the distilled-off or evaporated organochemical solvent is attached to the distillation and/or evaporation device 10 via at least one hose and/or pipe. The distillation and/or evaporation device is connected to at least one collecting device part, a collecting tank and/or a further tank 16, 17 for the surfactant-containing liquid. The tank 16 for the surfactant-containing liquid is preferably connected to the distillation and/or evaporation device 10, preferably co-using at least one pipe and/or hose and at least one cooling device 15. The collecting tank need not necessarily be separate from the froth scrubber tower 1, but instead, according to one embodiment, is arranged as the collecting device part of the lower part apparatus of the froth scrubber tower 1.

According to a further advantageous embodiment, the tank for the surfactant-containing liquid 16 and/or 17 is connected indirectly to a froth production unit 4 and/or a froth generator and to the froth scrubber tower 1, or the surfactant-containing liquid is fed directly to the tower and/or vessel 1 for froth formation.

According to a preferred embodiment, the tank 16 for the surfactant-containing liquid is connected to a batch tank 17 for adjusting the desired use concentration, and the latter is connected to a froth production unit 4 and/or a froth generator and to the froth scrubber tower and/or directly to the froth scrubber tower 1, preferably via a pipe or hose. According to a further advantageous embodiment, the surfactant-containing liquid withdrawn reaches the froth scrubber vessel 1 together or separately with gas, for example air, introduced under pressure or under reduced pressure.

At least one distribution device 7 for introducing surfactant-containing liquid in the form of fresh solutions, solutions from the batch tank and/or for resaturating the individual components present in the surfactant-containing liquid is arranged above at least one sieve tray at a distance which is greater than a quarter of the diameter of the sieve tray, preferably greater than half the diameter of the sieve tray, and/or greater than the froth depth introduced into the froth scrubber tower 1.

Figure 3:
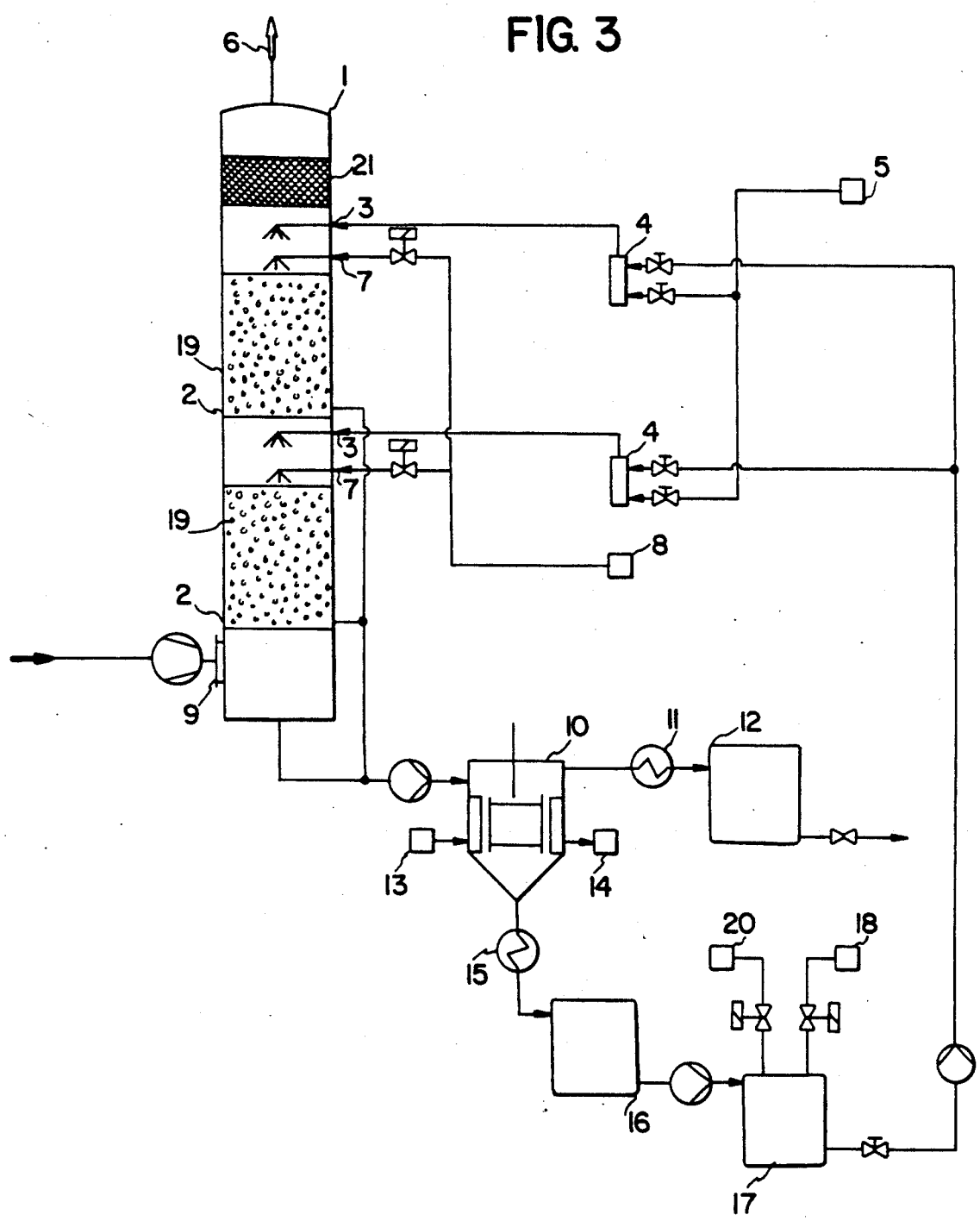

According to a further advantageous embodiment, the froth scrubber tower 1 comprises two or more vessels, preferably arranged vertically above one another, which have at least one perforated element, grid element or screen element 2, a froth dispensing device or froth distribution device 3 and/or a froth production unit 4 and/or a distribution device 7 for introducing surfactant-containing liquid (fresh solution) or components thereof, preferably from a tank 8, as shown in FIG. 3, and are connected to one another and/or to the lowermost tank.

The present invention is further described by reference to the following examples.

Illustrative Embodiments of the Surfactant-Containing Liquid

| | Example 1 | |
|---|---|---|
| 1.5 | % by weight | of fluorine-containing surfactant |
| 98.5 | % by weight | of benzyl octyl adipate |
| | Example 2 | |
| 1.5 | % by weight | of fluorine-containing surfactant |
| 1.0 | % by weight | of oleic acid polydiethanolamide |
| 60.0 | % by weight | of benzyl octyl adipate |
| 37.5 | % by weight | of diisonyl adipate |
| | Example 3 | |
| 1.0 | % by weight | of fluorine-containing surfactant |
| 1.0 | % by weight | of coconut fatty acid diethanolamide |
| 0.5 | % by weight | of trialkanolammonium dodecylbenzene-sulfonate |
| 97.5 | % by weight | of benzyl octyl adipate |

What is claimed is:

1. An apparatus for removing an organochemical component from a gas, comprising:
    a froth scrubber tower that comprises an inlet for entry of a gas to be decontaminated, an outlet for exit of decontaminated gas, at least one perforated grid element attached to and located inside the front scrubber tower such that a cross-sectional area of the froth scrubber tower is covered by at least one perforated grid element, and a chamber for interaction between the gas and the froth;
    a froth production unit connected to the froth scrubber tower, wherein said connection is located above at least one perforated grid element;
    at least one distillation device or evaporation device connected to the bottom of the froth scrubber tower, for removing at least one organic chemical component from the gas; and
    a droplet removal device located inside and in close proximity to the top of the froth scrubber tower before the outlet for exit of the decontaminated gas.

2. An apparatus as claimed in claim 1, wherein said froth production unit is located outside the froth scrubber tower and said apparatus further comprises a first froth distribution device comprising two ends, one end of which is connected to said froth production unit and the other end of which is inserted into the froth scrubber tower.

3. An apparatus as claimed in claim 2, further comprising a second froth distribution device that comprises two ends, one end of which is inserted into the froth scrubber tower.

4. An apparatus as claimed in claim 3, further comprising a tank for storage of fresh surfactant-containing liquid and to which the second end of the second froth distribution device is connected.

5. An apparatus as claimed in claim 4, wherein one end of at least one of the first or second froth distribution device is inserted into the froth scrubber tower above at least one perforated grid element.

6. An apparatus as claimed in claim 3, wherein the first or second froth distribution device is arranged above the perforated grid element at a distance that is greater than a quarter of the diameter of the perforated grid element.

7. An apparatus as claimed in claim 2, wherein one end of the first froth distribution device is inserted into the froth scrubber tower above at least one perforated grid element.

8. An apparatus as claimed in claim 7, wherein the first forth distribution device is arranged above the perforated grid element at a distance that is greater than a quarter of the diameter of the perforated grid element.

9. An apparatus as claimed in claim 1, wherein at least one collection tank for collection of surfactant-containing liquid is connected to the distillation or evaporation device.

10. An apparatus as claimed in claim 9, wherein the collecting tank for collection of the surfactant-containing liquid is connected to said froth production unit.

11. An apparatus as claimed in claim 10, wherein the connection between the collecting tank for collection of the surfactant-containing liquid and the froth production unit is interrupted by a batch tank for adjustment of the concentration of the surfactant-containing liquid.

12. An apparatus as claimed in claim 9, wherein said apparatus comprises a plurality of said froth scrubber towers, each of which is connected to one another and/or to the lowermost tank.

* * * * *